United States Patent
Goldner et al.

(10) Patent No.: US 6,320,992 B1
(45) Date of Patent: Nov. 20, 2001

(54) INTEGRATED OPTIC ACCELEROMETER AND METHOD

(75) Inventors: Eric L. Goldner, Valencia; Craig W. Hodgson, Thousand Oaks, both of CA (US)

(73) Assignee: Litton Systems, Inc., Woodland Hills, CA (US)

( * ) Notice: Subject to any disclaimer, the term of this patent is extended or adjusted under 35 U.S.C. 154(b) by 0 days.

(21) Appl. No.: 09/124,937

(22) Filed: Jul. 29, 1998

(51) Int. Cl.[7] .............................. G02B 6/00; G01P 15/00
(52) U.S. Cl. .............................................. 385/13; 702/141
(58) Field of Search ...................... 385/12, 13; 702/141; 356/35.5

(56) References Cited

U.S. PATENT DOCUMENTS

| | | | | |
|---|---|---|---|---|
| 5,317,929 | * | 6/1994 | Brown et al. ............................ | 73/517 |
| 5,633,960 | * | 5/1997 | Lagakos et al. ........................ | 385/12 |
| 5,680,489 | * | 10/1997 | Kersey .................................... | 385/12 |
| 5,903,349 | * | 5/1999 | Vohra et al. ............................ | 356/345 |
| 6,018,390 | * | 1/2000 | Youmans et al. ...................... | 385/12 |

\* cited by examiner

*Primary Examiner*—Cassandra Spyrou
*Assistant Examiner*—Jared Treas
(74) *Attorney, Agent, or Firm*—Lynn & Lynn

(57) ABSTRACT

An optical waveguide is formed on a first side of an integrated optics substrate. The optical waveguide is included in a first arm of an interferometer that is arranged to produce an interference pattern. The integrated optics substrate is mounted and arranged such that acceleration of the integrated optics substrate along a selected axis produces a change in the interference pattern. Changes in the interference pattern are monitored and correlated with the acceleration.

6 Claims, 3 Drawing Sheets ated optics substrate. The substrate is preferably formed to comprise silica or silicon, lithium niobate, polymer waveguide structure or other similar material suitable for serving as a substrate for an optical waveguide. The sensor according to the present invention is potentially low cost because it utilizes standard photolithographic and vacuum deposition processes common to the microelectronics and integrated optics industries. Assembly of the device can be very robust, thereby further reducing the cost of manufacture and increasing durability while the device is in use.

INTEGRATED OPTIC ACCELEROMETER AND METHOD

BACKGROUND OF THE INVENTION

This invention relates generally to measurement of acceleration and particularly to measurement of acceleration by means of an interferometer.

The prior art suffers from several factors. Conventional piezoelectric accelerometer devices require significant mechanical support structure to isolate them from platform self noise. Electronics required near the sensor are a significant reliability issue, especially for marine applications. Telemetry with multiplexed sensors requires yet additional electronics that may need to be located in a hostile environment.

SUMMARY OF THE INVENTION

The present invention measures the amplitude of a wide bandwidth acceleration input by converting the acceleration into a mechanical strain, then into an electrical signal via an optical interferometer that has at least one arm formed to include an integrated optics waveguide. The integrated optics waveguide is formed in an integrated optics substrate. The substrate is preferably formed to comprise silica or silicon, lithium niobate, polymer waveguide structure or other similar material suitable for serving as a substrate for an optical waveguide. The sensor according to the present invention is potentially low cost because it utilizes standard photolithographic and vacuum deposition processes common to the microelectronics and integrated optics industries. Assembly of the device can be very robust, thereby further reducing the cost of manufacture and increasing durability while the device is in use.

An acceleration sensor according to the present invention comprises an integrated optics substrate having a first optical waveguide of a selected length formed on a first side thereof. The optical waveguide is included in a first arm of an interferometer that is arranged to produce an interference pattern. The integrated optics substrate is mounted and arranged such that acceleration of the integrated optics substrate along a selected axis produces a change in the interference pattern. Changes in the interference pattern are monitored and correlated with the acceleration.

The interferometer is preferably formed to include a second optical waveguide in a second arm. The second interferometer may be formed on the side of the substrate opposite the first optical waveguide. Alternatively, the second optical waveguide may be formed on a second integrated optics substrate. The substrates may be mounted together back-to-back.

In a preferred embodiment of the invention, the optical waveguides include reflecting apparatus arranged such that the interferometer is formed in the Michelson configuration.

Optical signals may be introduced into the two optical waveguides by means of optical fibers mounted to the substrates and arranged to be end-to-end with the corresponding optical waveguides. An optical coupler is arranged to couple optical signals between the optical fibers so that part of the light from a light source is coupled from one fiber into the other. The result is that optical signals having a definite phase relationship are coupled into the two arms of the interferometer. Acceleration along the sensing axis then increases the length of one optical waveguide and decreases the length of the other, which changes the phase relationship between light in the two arms of the interferometer.

The interferometer is mounted in a housing. In one embodiment of the invention the interferometer is mounted to a post mounted in the housing, such that the periphery of the integrated optics substrate becomes displaced lengthwise along the longitudinal axis of the post in response to acceleration of the housing along the longitudinal axis of the post. In another embodiment of the invention, the integrated optics substrate has its periphery mounted to the housing such that the central portion of the integrated optics substrate becomes displaced along an axis perpendicular to optical waveguide in response to acceleration of the housing.

An appreciation of the objectives of the present invention and a more complete understanding of its structure and method of operation may be had by studying the following description of the preferred embodiment and by referring to the accompanying drawings.

DESCRIPTION OF THE PREFERRED EMBODIMENT

As shown in FIGS. 1–4 an integrated optic accelerometer 10 according to the present invention includes a substrate 12 formed of a material such as silicon, lithium niobate or other material suitable as a substrate for optical waveguides. The substrate 12 preferably is formed as a disk that has a diameter of about 2 to 6 cm and a thickness of about 500 $\mu$m to 800 $\mu$m.

Figure 2:
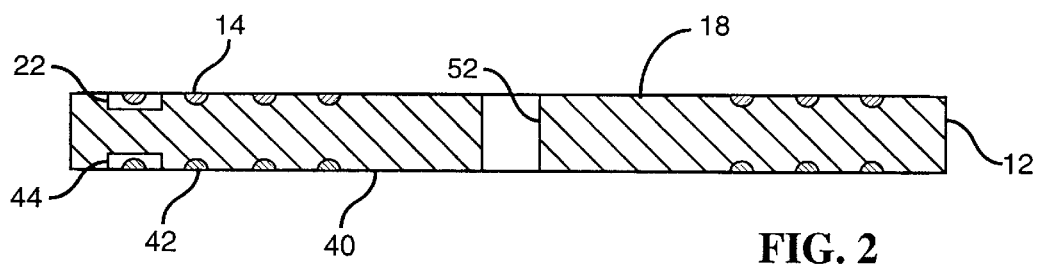
FIG. 2 is a cross sectional view of an integrated optic substrate that may be included in the apparatus of FIG. 1.
Figure 4:
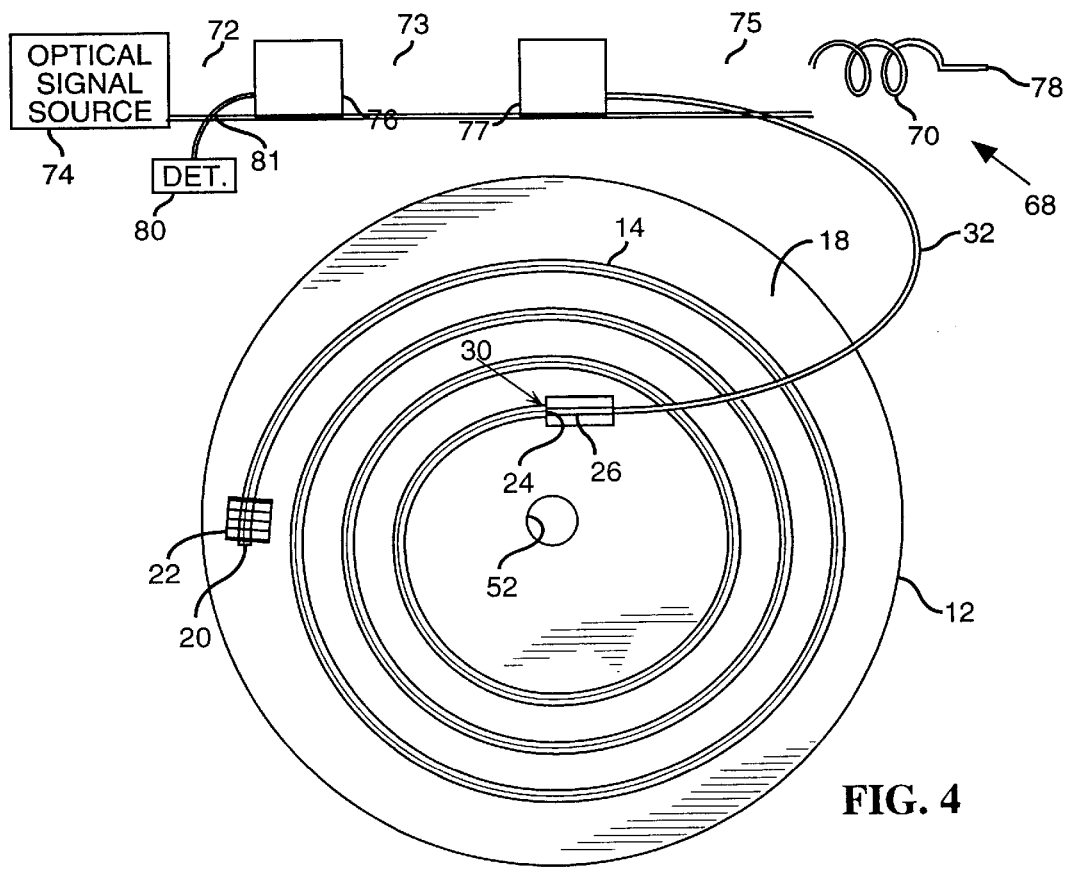
FIG. 4 is a top plan view of an integrated optic substrate that includes a spiral-shaped optical waveguide and an optical fiber coupled together to form an interferometer.

As best shown in FIGS. 2 and 4, a spiral-shaped optical waveguide 14 is formed on (or in) the substrate 12 at a surface 18 thereof. The optical waveguide 14 is formed using standard photolithographic and vacuum deposition processes common to microelectronics and integrated optics technologies. For example, if the substrate 12 is formed of silicon, then the optical waveguide 14 may be formed by masking the substrate followed by vaccuum deposition of silica with appropriate dopant such as germanium to raise the local refractive index of the waveguide.

An end 20 of the optical waveguide 14 is made to be reflective either by the application of a reflective coating at the end 20 or by the deposition of an appropriate material to the surface of the waveguide 14 in a pattern that forms a diffraction grating 22 that serves as a mirror.

Figure 3:
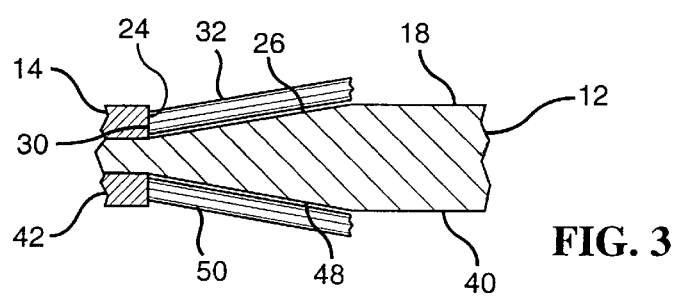
FIG. 3 is a cross sectional view of an integrated optics substrate showing a pair of optical fibers arranged for optical coupling with a corresponding pair of optical waveguides formed in the substrate.
Figure 5:
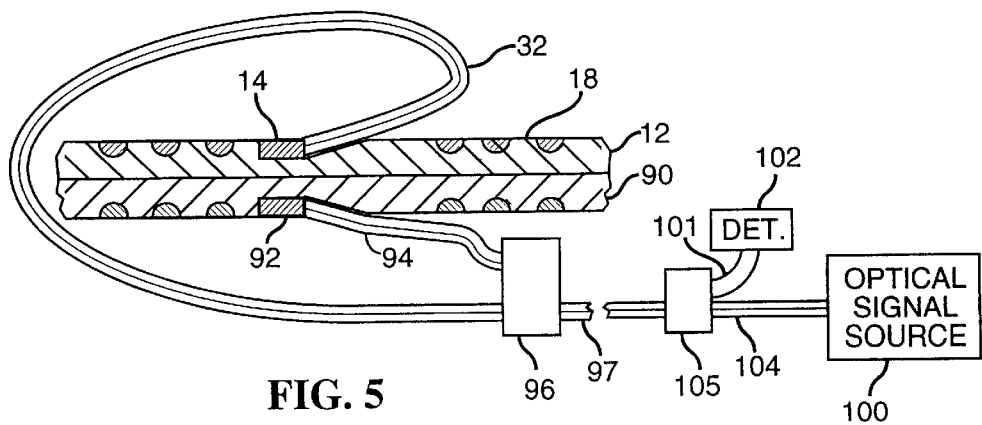
FIG. 5 is a cross sectional view showing a pair of optical substrates mounted back-to-back with optical fibers coupled to optical waveguides formed on the substrates and coupled together to form an interferometer.

FIG. 3 shows a partial cross sectional view of the substrate 12. Referring to FIGS. 3 and 5, a portion of the substrate 12 is removed by etching, or other suitable technique, to form a slanted slot 26 in the substrate 12 from the surface 18 down to the end 24 of the optical waveguide 14. An end 30 of an optical fiber 32 is placed in the slot 26 and butt-coupled to the end 24 of the optical waveguide 14. An adhesive or other suitable potting material may be used to secure the optical fiber 32 in the slot 26. The optical fiber 32 is thus used to introduce light from an optical signal source 34, such as a laser, into the optical waveguide 14.

FIG. 2 is a cross sectional view taken through the center of the substrate 12. The dimensions of the substrate 12, the optical waveguide 14 and the grating 22 are enlarged in the interest of better illustrating the invention. FIG. 2 shows the portions of the optical waveguide 14 that cross the diameter of the substrate 12.

Figure 1:
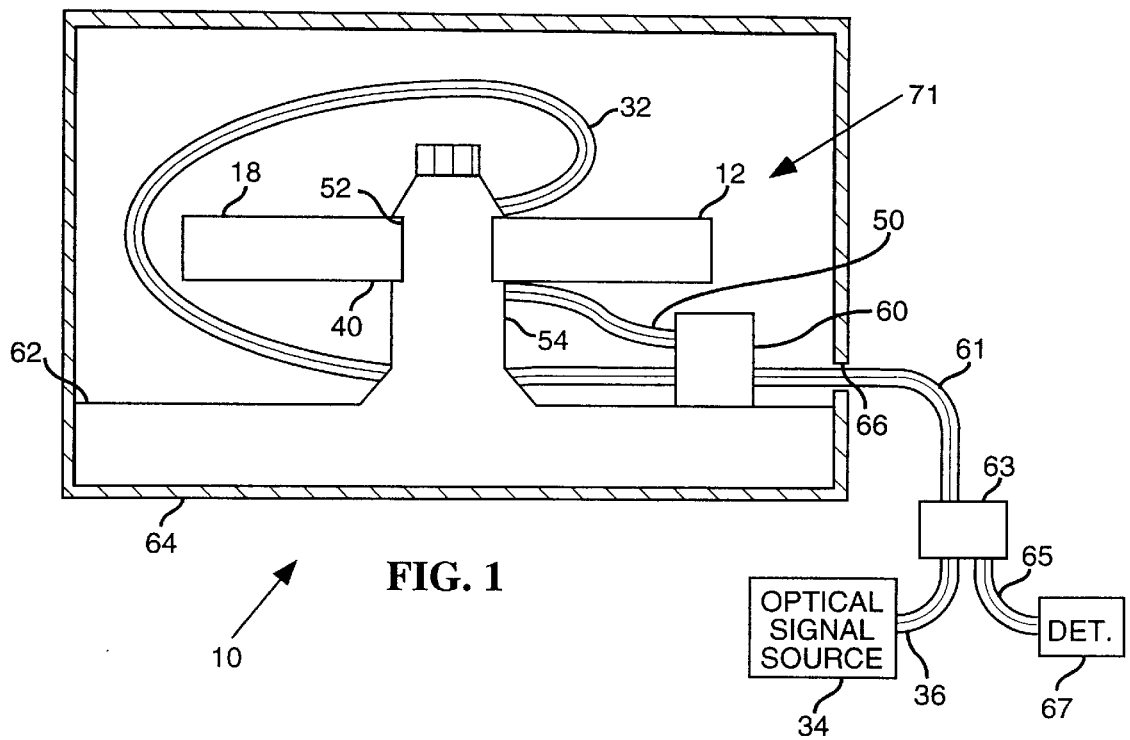
FIG. 1 is a front elevation view of an integrated optic accelerometer according to present invention mounted in a housing that is shown in cross section.

FIGS. 1–3 show an embodiment of the invention where the other side 40 of the substrate 12 has a second optical waveguide 42 formed thereon. The optical waveguide 42 preferably is a mirror image of the optical waveguide 14. The second optical waveguide 42 preferably also has a grating 44 formed at the outer end to act as a mirror. A second slanted slot 48 is formed in the side 40 of the substrate 12 so that an optical fiber 50 may be butt-coupled to the optical waveguide 42.

Referring again to FIG. 1, the substrate 12 of FIG. 1 is understood to have the optical waveguides 14 and 42 of FIGS. 2 and 3 formed on opposite sides 18 and 40 thereof as described above.

The optical signal source 34 provides optical signals to an optical fiber 36, which guides the input optical signals to an optical coupler 63. The source light exits the coupler 63 via an optical fiber 61 and propagates to an optical coupler 60. The source light divides in the coupler 60 so that substantially equal beam intensities are input to the optical fibers 32 and 50, which guide the source light to the optical waveguides 14 and 42, respectively. The source light reflects from the reflectors 22 and 44 near the ends of the optical waveguides 14 and 42, respectively.

After reflection and again traversing the length of the optical waveguides 14 and 42, the optical signals are guided by the optical fibers 32 and 50 to the optical coupler 60. The optical signals combine in the coupler 60 and produce an interference pattern.

The optical fiber 61 guides the interference pattern away from the optical coupler 60 to the optical coupler 63, The optical couplers 60 and 63 may be evanescent field couplers or other suitable optical coupling structures for coupling optical signals between two optical fibers.

The optical waveguides 14 and 42 thus are included in first and second arms, respectively, of an interferometer 71. The result of having reflectors 22 and 42 formed on ends 20 and 46 of the optical fibers optical waveguides 14 and 42 and having optical fibers 32 and 50 optically coupled is a Michelson interferometer. The arms of the interferometer 71 receive optical signal inputs that have a known phase relationship. The combined signals propagate through a fiber 65 to a detector 67, which produces electrical signals that are processed to determine the acceleration.

As best shown in FIGS. 1 and 2, the substrate 12 includes a central passage 52, which is used to mount the substrate on a post 54. The post 54 preferably extends perpendicularly outward from a base 62, and the entire assembly of the substrate 12, post 54, base 62 and coupler 60 is located in a housing 64, which is shown in cross section in FIG. 1. The coupler 60 preferably is secured to the base 62. The optical fiber 61 extends through a passage 66 in the housing 64. When the optical signal source is applied to the Michelson interferometer, the output signal is an optical interference pattern that indicates the phase difference between light guided by the two arms of the interferometer.

The integrated optic accelerometer 10 according to the present invention is used to form a signal for measuring the acceleration of the electrical signal. Acceleration of the integrated optic accelerometer 10 along the axis of the post 54 deforms the substrate 12.

Figure 6:
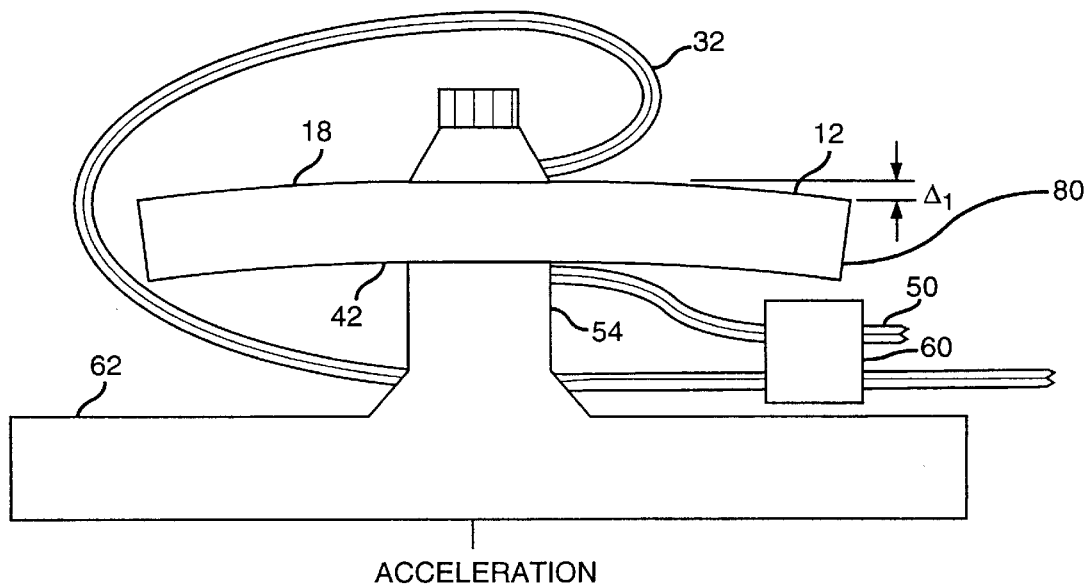
FIG. 6 illustrates deformation of a center-mounted integrated optic substrate in response to acceleration along an axis perpendicular to the plane of the substrate.

Referring to FIG. 6, acceleration in the direction of the arrow deflects the outer edge 80 of the substrate 12 by a distance $\Delta_1$. This deflection of the edge 80 of the substrate 12 increases the length of the optical waveguide 14 and decreases the length of the optical waveguide 42. Likewise, acceleration downward in the plane of the paper decreases the length of the optical waveguide 14 and increases the length of the optical waveguide 42. The difference in the length changes of the optical waveguides 14 and 42 changes the optical interference pattern output from the Michelson interferometer.

Figure 7:
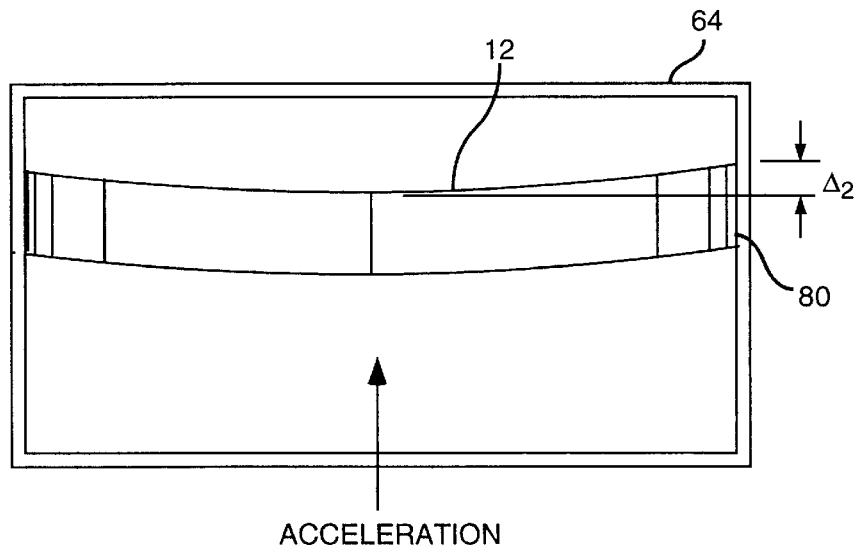
FIG. 7 illustrates deformation of an edge-mounted integrated optic substrate in response to acceleration along an axis perpendicular to the plane of the substrate.

FIG. 7 illustrates the effect of acceleration along an axis perpendicular to the plane of the substrate when the substrate 12 has its outer edge 80 mounted to the housing 64. The center of the substrate 12 is deflected along the sensing axis by a distance $\Delta_2$. With the edge mounted substrate, there is little strain of the outer portion of the coiled optical waveguides 14 and 42. Instead, the center of the substrate has the largest displacement. The edge mounted substrate is more rigid than the center mounted embodiment shown in FIG. 1.

FIG. 4 illustrates an embodiment of the invention in which an interferometer 68 has a sensing arm that includes the optical waveguide 14 and a reference arm formed to include a coil 70 of an optical fiber 75. An optical signal source 74 provides light to an optical fiber 72, which guides the light to an optical coupler 76. The optical coupler 76 couples part of the source light into an optical fiber 73, which guides the light to an optical coupler 77. The coupler 77 divides the input light between the optical fiber 32 and the optical fiber 75. The optical fiber 32 guides the light to the optical waveguide 14 as in the embodiment of the invention described with reference to FIGS. 1–3.

The end 78 of the optical fiber coil 70 is reflective so that the reference signals input to the coil 70 are reflected back to the optical coupler 77. The coupler 77 also receives signals reflected from the grating 22 or the mirrored end 20 of the optical waveguide 14. Signals from the two arms of the interferometer 68 combine in the coupler 77 to produce an interference pattern. The interference pattern within the light intensity is guided by the optical fiber 73 to the coupler 76. An optical fiber 81 guides the interference pattern from the coupler 76 to a detector 80. The detector 80 produces electrical signals that indicate the light intensity signal produced by the interferometer. These electrical signals may then be processed to determine the acceleration of the substrate 12 as described above.

FIG. 5 illustrates an embodiment of the invention that includes a second integrated optics substrate 90 mounted back-to-back with the substrate 12. The second substrate is 90 is mounted to the substrate 12 by an adhesive of appropriate elastic modulus and coefficient of thermal expansion. The substrate 90 preferably has a spiral optical waveguide 92 formed thereon in the manner described above for the optical waveguide 42. An optical fiber 94 is connected to the optical waveguide 92. Signals guided by the optical fibers 32 and 94 are optically coupled by a coupler 96 to form an interferometer as described above. An optical fiber 97 is connected between the coupler 96 and a coupler 105. An optical fiber 104 is connected between the coupler 105 and an optical signal source 100.

The optical fiber 104 guides optical signals from the optical signal source 100 to the coupler 105, and the optical fiber 97 guides the source light from the coupler 105 to the coupler 96. The coupler 96 divides the source light between the optical fibers 32 and 94 to provide the light input for the interferometer.

After reflecting from the ends of the optical waveguides 14 and 92, the light propagates in the optical fibers 32 and 94 to the coupler 96 where the optical signals that had been in the separate fiber 32 and 94 combine to produce an interference pattern. The combined signals propagate in the fiber 97 to the coupler 105. An optical fiber 101 guides the combined signals to a detector 102 that is arranged to produce an electrical signal to indicate the output of the interferometer.

The structures and methods disclosed herein illustrate the principles of the present invention. The invention may be embodied in other specific forms without departing from its spirit or essential characteristics. The described embodiments are to be considered in all respects as exemplary and illustrative rather than restrictive. Therefore, the appended claims rather than the foregoing description define the scope of the invention. All modifications to the embodiments described herein that come within the meaning and range of equivalence of the claims are embraced within the scope of the invention.

What is claimed is:

1. An acceleration sensor, comprising:

an integrated optics substrate;

an integrated optics waveguide having a selected length formed generally in a spiral-shaped configuration in the integrated optics substrate;

an optical fiber having a first end coupled to a first end of the integrated optics waveguide to transfer optical signals therebetween;

an optical coupler connected to a second end of the optical fiber;

an optical fiber coil connected to the optical coupler, the optical fiber coil, the optical coupler and the integrated optics waveguide being arranged to be included in an interferometer, the interferometer being arranged to produce an optical signal;

mounting apparatus arranged to mount the integrated optics substrate such that acceleration of the integrated optics substrate along a selected axis produces a strain in the substrate that causes a change in the length of the first integrated optics waveguide to produce a change in the optical signal;

apparatus for monitoring the optical signal and correlating the change in the optical signal with the acceleration; and wherein the integrated optics waveguide is embedded in the substrate and wherein the substrate further includes a slanted slot therein that extends to the second end of the optical waveguide, the first end of the optical fiber being positioned within the slot and butt-coupled to the second end of the integrated optics waveguide.

2. The acceleration sensor of claim 1, further comprising a reflector formed adjacent a second end of the integrated optics waveguide.

3. The acceleration sensor of claim 1 wherein the reflector comprises a Bragg grating.

4. An acceleration sensor, comprising:

an integrated optics substrate;

a first integrated optics waveguide of a first length formed generally in a spiral-shaped configuration in a first portion of the integrated optics substrate;

a first optical fiber coupled to a first end of the first integrated optics waveguide;

a second integrated optics waveguide of a second length formed generally in a spiral-shaped configuration in a second portion of the integrated optics substrate such that the first and second integrated optics waveguides face in opposite directions;

a second optical fiber coupled to a first end of the second integrated optics waveguide; and an optical coupler arranged to couple optical signals between the first and second optical fibers, the first and second integrated optics waveguides, the first and second optical fibers and the optical coupler being arranged to be included in an interferometer with the first integrated optics waveguide and the first optical fiber forming a first optical path of the interferometer and the second integrated optics waveguide and the second optical fiber forming a second optical path of the interferometer, the interferometer producing an optical signal that indicates acceleration of the integrated optics substrate along a selected axis;

wherein the first and second integrated optics waveguides are embedded in the integrated optics substrate and wherein the integrated optics substrate further includes:

a first slanted slot therein that extends to the second end of the first integrated optics waveguide, the first end of the first optical fiber being positioned within the first slot and butt-coupled to the second end of the first integrated optics waveguide; and a second slanted slot therein that extends to the second end of the second integrated optics waveguide, the first end of the second optical fiber being positioned within the second slot and butt-coupled to the second end of the second integrated optics waveguide.

5. The acceleration sensor of claim 4, further comprising:

a first reflector formed adjacent a second end of the first integrated optics waveguide; and a second reflector formed adjacent a second end of the second integrated optics waveguides.

6. The acceleration sensor of claim 4 wherein each of the first and second reflectors comprises a Bragg grating.

* * * * *